United States Patent
Balakrishnan et al.

(10) Patent No.: US 9,032,369 B2
(45) Date of Patent: May 12, 2015

(54) SYSTEMS AND/OR METHODS FOR EXECUTING APPROPRIATE TESTS BASED ON CODE MODIFICATIONS USING LIVE, DISTRIBUTED, REAL-TIME CACHE AND FEEDBACK LOOP

(75) Inventors: Balaji Balakrishnan, Chennai (IN); Vasudeva Rao Kothamasu, Chennai (IN); Gary Woods, Seeheim (DE)

(73) Assignee: Software AG, Darmstadt (DE)

( * ) Notice: Subject to any disclaimer, the term of this patent is extended or adjusted under 35 U.S.C. 154(b) by 507 days.

(21) Appl. No.: 13/429,924

(22) Filed: Mar. 26, 2012

(65) Prior Publication Data

US 2013/0254746 A1   Sep. 26, 2013

(51) Int. Cl.
*G06F 9/44*   (2006.01)
*G06F 11/36*   (2006.01)

(52) U.S. Cl.
CPC ........ *G06F 11/3608* (2013.01); *G06F 11/3676* (2013.01)

(58) Field of Classification Search
CPC ... G06F 9/44; G06F 11/3608; G06F 11/3676; G06F 11/3684
USPC ....................................................... 717/124
See application file for complete search history.

(56) References Cited

U.S. PATENT DOCUMENTS

| | | | | |
|---|---|---|---|---|
| 4,989,132 A | * | 1/1991 | Mellender et al. ............ | 717/139 |
| 8,473,907 B1 | * | 6/2013 | Zandi et al. ................... | 717/120 |
| 2005/0223361 A1 | | 10/2005 | Belbute | |
| 2006/0253837 A1 | * | 11/2006 | Hudson et al. ................ | 717/124 |
| 2007/0168998 A1 | * | 7/2007 | Mehta et al. ................... | 717/130 |
| 2009/0125882 A1 | * | 5/2009 | Frigo et al. .................... | 717/116 |
| 2010/0275185 A1 | * | 10/2010 | Burton et al. ................. | 717/130 |
| 2011/0145793 A1 | | 6/2011 | Alexander et al. | |
| 2012/0185827 A1 | * | 7/2012 | Eska et al. .................... | 717/121 |
| 2012/0324417 A1 | * | 12/2012 | Somani et al. ................ | 717/101 |

OTHER PUBLICATIONS

Java Performance Tuning—Tool Report: JProbe. Published Apr. 2003. [Retrieved Mar. 26, 2012]. http://www.javaperformancetuning.com/tools/jprobe/index.shtml.*

Java Performance Tuning—Tool Report: JProbe. Published Apr. 2003. [Retrieved Mar. 26, 2012]. http://www.javaperformancetuning.com/tools/iprobe/index.shtml.

* cited by examiner

*Primary Examiner* — Wei Zhen
*Assistant Examiner* — Mohammed Huda
(74) *Attorney, Agent, or Firm* — Nixon & Vanderhye PC

(57) ABSTRACT

Certain example embodiments relate to systems and/or methods for determining and/or executing an appropriate subset of tests in response to a code change. In certain example embodiments, hash digests or other unique values for code structures (such as, for example, classes, methods, and/or other structural elements) may be created. Tests associated those associated code structures may be identified. New hash digests or other unique values may be generated for the code structures after the source code has been modified. In response to a mismatch as between the existing and new hash digests or other unique values, a list of associated tests for possible subsequent execution may be retrieved. Certain example embodiments additionally or alternatively provide an incremental but consistent way of analyzing performance issues, e.g., in connection with a profiler.

25 Claims, 6 Drawing Sheets

SYSTEMS AND/OR METHODS FOR EXECUTING APPROPRIATE TESTS BASED ON CODE MODIFICATIONS USING LIVE, DISTRIBUTED, REAL-TIME CACHE AND FEEDBACK LOOP

FIELD OF THE INVENTION

Certain example embodiments described herein relate to systems and/or methods for determining and/or executing an appropriate subset of tests in response to a code change. More particularly, certain example embodiments described herein relate to techniques for creating hash digests or other unique values for code structures (such as, for example, classes, methods, and/or other structural elements), identifying tests associated with identified code structures, creating new hash digests or other unique values for code structures after the source code has been modified and, in response to a mismatch as between the existing and new hash digests or other unique values, retrieving a list of associated tests for subsequent execution. Certain example embodiments additionally or alternatively provide an incremental but consistent way of analyzing performance issues.

BACKGROUND AND SUMMARY OF EXAMPLE EMBODIMENTS OF THE INVENTION

Software products are oftentimes subjected to a variety of tests prior to and in the early stages of deployment. The number of tests that a software product is to go through depends on a variety of factors such as, for example, how large and/or complicated the program is, whether/how it relates to mission-critical or other key operations, the extent to which it interacts with other systems, etc. It is not uncommon for an enterprise product to be subjected to thousands of tests prior to deployment. For instance, during bug fixing or feature enhancement, a fairly typical design practice involves running (or re-running) all of the tests in the test plan to help validate (or re-validate) the application and make sure the new code change does not "break" any existing functionality.

One need not necessarily run all the tests at this time, at least in theory, because a given code change need not necessarily affect how all tests perform. In other words, some changes will have limited scopes and, as a result, it at least theoretically should be possible to avoid having to run (or re-run) the complete set of tests for all changes.

Unfortunately, however, it is not always readily apparent which code changes will affect the various parts of an application and/or the application's overall performance. Furthermore, complications in assessing the potential scope of a change may arise in the context of systems that are live, as it is not always easy to simply suspend operations for testing purposes. And yet further complications may arise in distributed environments.

U.S. Publication No. 2005/0223361 to Belbute, for example, unfortunately seems to involve a laborious process, e.g., as its realization seems to involve multiple products and also seems to involve instrumenting the code prior running the tests. Belbute also seems to rely on the order of nodes (lines of code). That is, the way it detects changes involves recording the node number it visits. Its approach therefore might not able to detect the change if a line of code is removed and another one is added at the same place. Moreover, it is unclear how changes at the class level are handled, as compared to changes at the method level. Its overall architecture might not be a good fit for distributed teams, in general. Belbute also seems to lack a learning mechanism such as, for example, a feedback loop.

U.S. Publication No. US 2011/0145793 to Alexander et al. apparently provides an approach for tagging components in a software application and assigning them to a test scheme. Unfortunately, as above, its process seems to be laborious. Because it uses code coverage (tools) as the mechanism to track changes, this needs to be done for each test case in a test suite. Thus, one cannot simply run the test suite. Instead, each test should be interrupted to allow code coverage to record and reset it values. This might seemingly imply a manual approach to certain aspects. And as with Belbute, Alexander seems to rely on the line numbers of the code, e.g., in connection with its code coverage tool visits, which is disadvantageous for at least the reasons identified above. The lack of a learning mechanism (e.g., a feedback loop) also potentially slows debugging and/or testing processes.

Thus, it will be appreciated that there is a need in the art for improved testing techniques, e.g., for pre- and/or post-deployed applications.

One aspect of certain example embodiments relates to techniques by which a software engineer or other individual can determine the most probable subset of possible tests that is sufficient to validate a code change, program modification, update, or the like. By executing the subset of appropriate tests, it advantageously becomes possible to improve productivity and save resources that otherwise might be wasted during the execution of inappropriate or unnecessary tests. Advantageously, certain example techniques described herein may be used in connection with distributed product development teams (e.g., teams comprising individuals and/or sharing processing resources located remote from one another).

Another aspect of certain example embodiments relates to an incremental but consistent way of analyzing performance issues.

In accordance with certain example embodiments, a first unique identifier is created for each method and/or other structure in a source file (and potentially for the source file itself) to be used in checking the integrity of the method when required. Tests are executed, and information is collected concerning the code structures (e.g., the methods) that each test cuts across. The time required to execute the tests also may be collected, and the failed tests that are to be fed-back into the system are recorded (e.g., the relevant tests for a code change may be executed, with previous failed tests being prioritized in the execution order.) A second unique identifier is created for each method and/or other structure in the modified source file (and potentially for the modified source file itself). If there is a difference between the first and second unique identifiers, then the information that was collected is used to arrive at a list of appropriate tests to be executed under different circumstances (e.g., for each test associated method).

Some source repositories may index and/or timestamp the code they include, since this oftentimes provides enough detail to identify the latest version of the code. Using an MD5 or other checksum, however, provides an identification technique that very likely distinguishes every changed method or other code structure from the next. Thus, it is possible to make the mapping (e.g., between the code structures and the tests that invoke or otherwise involve them) match to a particular version tested at a predetermined time, not to just the latest version.

In certain example embodiments, a method for testing computer code is provided. Source code related to an application to be executed on a computer system including processing resources is received. The source code is parsed into plural identified structures. Using a test computer, a hash algorithm is applied to each of the identified structures in the source code in order to generate a corresponding first unique identifier. The first unique identifiers are stored to a non-transitory computer readable storage location. Under the direction of the test computer, tests are performed on the application in connection with the source code. Using the test computer, structures in the source code associated with each test are identified. A mapping between the performed tests and the identified structures associated with the tests is stored to a or the non-transitory computer readable storage location.

According to certain example embodiments, in addition to some or all of these features, modified source code related to the application is received. The modified source code is parsed into plural identified structures. The hash algorithm is applied to each of the identified structures in the modified source code in order to generate a corresponding second unique identifier. First and second unique identifiers related to corresponding identified structures in the source code and the modified source code, respectively, are compared. When a difference is detected between compared first and second unique identifiers, a list of any tests associated with the non-matching identifiers is generated from the mapping.

According to certain example embodiments, in addition to some or all of these features, first computer processing resource performance information is gathered for the processing resources of the computer system during execution of the application in connection with the source code. The first computer processing resource performance information is stored in connection with the mapping. Modified source code related to the application is received. Second computer processing resource performance information is gathered for the processing resources of the computer system during execution of the application in connection with the modified source code. First and second computer processing resource performance information is compared for each of the processing resources of the computer system. When a difference is detected between the compared first and second computer processing resource performance information and the difference exceeds a predetermined threshold value: the modified source code is parsed into plural identified structures; the hash algorithm is applied to each of the identified structures in the modified source code in order to generate a corresponding second unique identifier; first and second unique identifiers related to corresponding identified structures in the source code and the modified source code, respectively, are compared; and when a difference is detected between compared first and second unique identifiers, a list of any tests associated with the non-matching is generated from the mapping.

In certain example embodiments, non-transitory computer readable storage media tangibly storing instructions that, when executed by at least one processor of a computer, may perform one of these and/or other methods.

Identifiable structures may include method and non-method structures, in certain example embodiments, identifiable non-method structures possibly including class structures in some cases.

In certain example embodiments, a test system is provided. At least one processor and a memory are arranged to execute plural modules. For instance, a parser module is configured to receive source code related to an application to be executed on a computer system including processing resources and to identify plural structures in the received source code. The structures are identifiable as being one of a method structure or a non-method structure. A digester module is configured to apply a hash algorithm to each identified structure in the source code in order to generate a corresponding unique identifier. A non-transitory computer readable medium is configured to store the unique identifiers. The test system is configured to use its at least one processor to at least: cause tests to be performed on the application in connection with the source code, determine which identified structure(s) in the source code is/are associated with each said test, and store a mapping between the performed tests and the identified structures associated with the tests to a or the non-transitory computer readable medium.

According to certain example embodiments, in addition to some or all of these features, original source code and modified source code are provided to the parser module, and first identified structures for the original source code and second identified structures for the modified source code are provided to the digester module. A comparison module is configured to: compare first and second unique identifiers related to corresponding identified structures in the original source code and the modified source code, respectively, and generate from the mapping, when a difference is detected between compared first and second unique identifiers, a list of any tests associated with the non-matching identifiers.

According to certain example embodiments, in addition to some or all of these features, an application profiler is provided and is configured to track performance statistics of the processing resources of the computer system on which the application is executed, at least during testing. For instance, the application profiler is configured to track performance statistics of the processing resources of the computer system on which the application is executed during testing for both first and second separate builds of the application. A first comparison module is configured to compare performance statistics for the first and second builds, with code for the first and second builds being provided to the parser, and with identified structures generated by the parser being provided to the digester in order to generate first and second unique identifiers for the first and second builds, respectively. A second comparison module is configured to compare first and second unique identifiers related to corresponding identified structures in the first and second builds, respectively, when the first comparison module indicates that there is a potentially significant deviation between performance statistics associated with the first and second builds. A report module is configured to generate a list of any tests associated with the first and second unique identifiers that do not match as determined by the second comparison module.

According to certain example embodiments, in addition to some or all of these features, a listener is provided and is configured to detect code check-in events at a source code repository. For instance, the listener is further configured to initiate testing as between code designated as baseline code and newly checked-in code by: providing to the parser module the newly checked-in code; providing to the digester module second identified structures for the newly checked-in code; and initiating a comparison module. That comparison module may compare first and second unique identifiers related to corresponding identified structures in the baseline code and the newly checked-in code, respectively, and generate from the mapping, when a difference is detected between compared first and second unique identifiers, a list of any tests associated with the non-matching identifiers.

It will be appreciated that non-matching identifiers may be caused as a result of changes as between different versions or snapshots in time, deletion of a structure, addition of a structure, etc.

The hash algorithm may be the MD5 algorithm, and the first and second unique identifiers are MD5 digests, in certain example embodiments.

The same or different distributed caches may be used in connection with different example embodiments.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
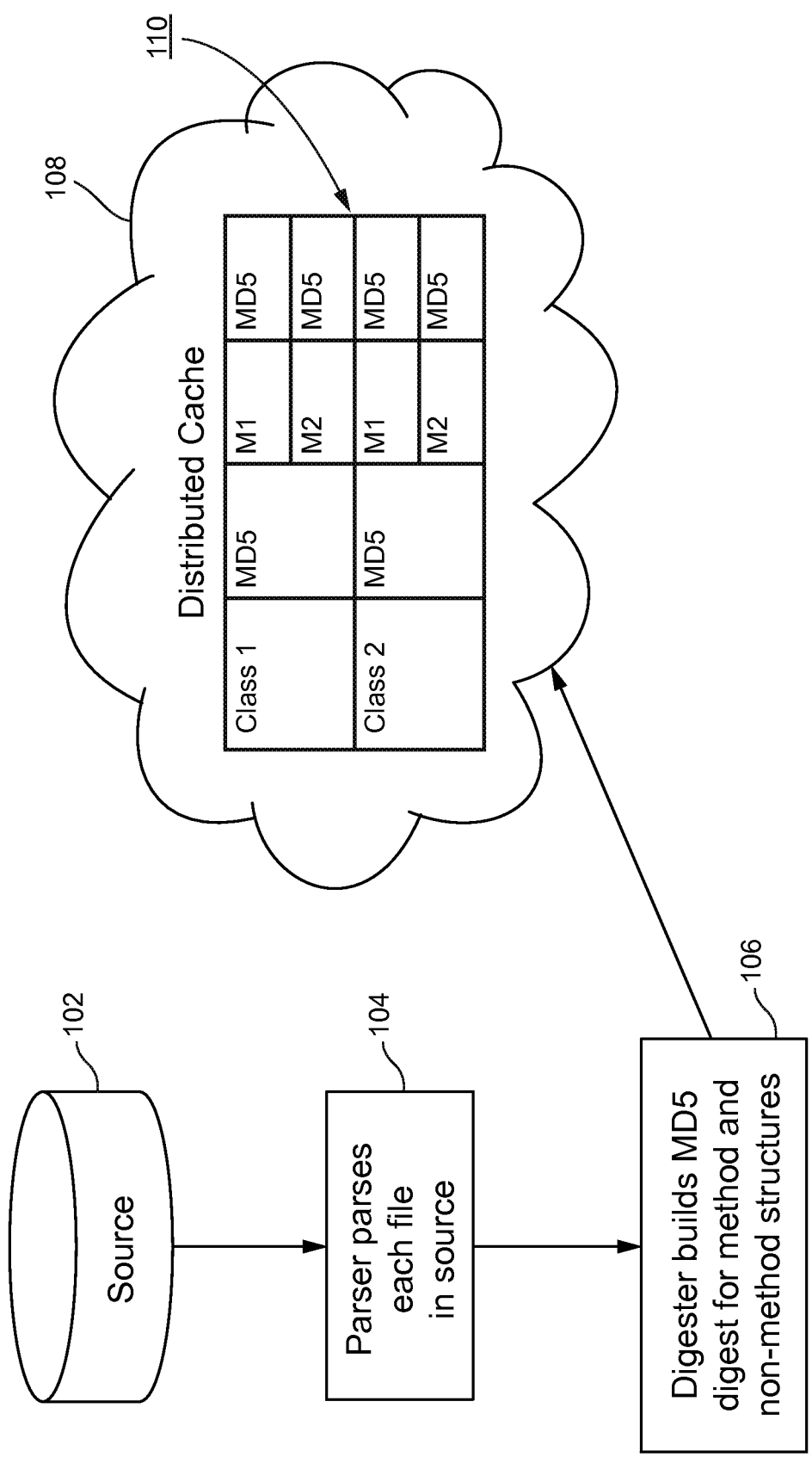
FIG. 1 helps illustrate how a distributed cache storing digests of various code segments may be generated in accordance with certain example embodiments.

Certain example embodiments relate to techniques by which a software engineer or other individual can determine the most probable subset of possible tests that is sufficient to validate a code change, program modification, update, or the like. By executing the subset of appropriate tests, it advantageously becomes possible to improve productivity and save resources that otherwise might be wasted during the execution of inappropriate or unnecessary tests. Advantageously, certain example techniques described herein may be used in connection with distributed product development teams (e.g., teams comprising individuals and/or sharing processing resources located remote from one another). Certain example embodiments also relate to techniques for incremental but consistent ways of analyzing performance issues.

The techniques of certain example embodiments may include the following and/or other example steps:

In a first step, a first unique identifier is created and saved for each method in a source file. The first unique identifier may be updated when there is a change in the source repository. In certain example embodiments, the first unique identifier may be saved in a distributed cache, and the cache may be updated as and/or when there is a change in source repository. For instance, a crawler may crawl through a source repository (such as, for example, an Apache Subversion source repository) and create a unique identifier for each method and/or other structure in a source file, and possible for the source file itself, for use in checking the integrity of such elements at a later time. The crawler may save the unique identifier to a distributed cache or other centrally accessible storage location. When the data is saved in a distributed cache, it advantageously can be made available to a broad number of potential users located in potentially disparate locations. This advantageously allow for a more distributed development environment. In certain example embodiments, the first unique identifier may be based on an MD5 digest. MD5 is a well-known mechanism useful in integrity checks. By using the MD5 algorithm, even a very minor change likely can be detected from version-to-version, e.g., given that the minor change will be reflected in a very different digest being created as a result of the avalanche effect. As alluded to above, certain example embodiments may also detect changes at the non-method level (e.g., at the class level) and save the corresponding MD5 digest (e.g., for the class) in the distributed cache. In certain example embodiments, if there is class-level change, all of the methods in the class may be considered as having been changed. To help insure that this information is kept up-to-date (e.g., updated as soon as possible after a modification), certain example embodiments may incorporate a listener that listens to source repository check-in events and updates the cache as and/or when there is a change.

In a second step, tests are executed, and the methods that each test cut across are collected, potentially with the time required to execute the tests also being noted. Failed tests that will be fed back into the test system or also may be recorded. Methods may be instrumented on-the-fly by using Aspect Oriented Programming (AOP) techniques, AOP generally refers to a technique by which a programmer can focus on business needs, rather than some of the routine technical needs. For example, if a developer develops a function to credit money into an account, a business need relates to the calculation of credit and saving the same in an account—whereas logging of information for later analysis, security checks, database transaction, etc., are some example related technical needs. AOP may allow a programmer to attach hooks to certain structure (e.g., example methods) at a certain point (e.g., before method execution, after method execution, etc.). In that sense, logging and security modules may be seen as configuration hooks to the "credit" function. This also helps to keep the code more modular. Hooks can be turned on and off based on configurations. In general, "hooking" can be done in various ways including, for instance, compile time weaving, and runtime (e.g., on-the-fly) weaving. Compile time techniques generally involve injecting the hooks into the code during compilation or into the existing compiled code. Thus, the hooks may not be seen in the original source code, but instead can be seen if the compiled code is decompiled using a decompiler. These injections may not be modified at runtime. By contrast, runtime techniques may inject the hooks just-in-time for execution. Thus, hooks may not be seen in the original or in the compiled code. Runtime techniques may be advantageous in certain example embodiments, as programmers do not necessarily have to manage extra changes (e.g., there is a possibility to avoid new compilations and/or extra compilations). These techniques also may be used, for example, to collect information such as method name that will be executed, time taken for execution, etc. AspectJ, a free AOP framework for prototyping, may be used in connection with certain example embodiments. In certain example scenarios, this instrumented code may report the method information (e.g., which methods are run, how long they take to run, how many times they are run, etc.) when a test runs through it. It will be appreciated that the collected information may include the relationship between tests and methods, the time taken to execute the tests, records of failure, etc., may be saved in the distributed cache. The same and/or similar techniques may be used to gather related information for non-method structures (such as classes, etc.), with these and/or different metrics being kept. For instance, the time to construct and/or destruct data structures, the amount of memory used by a data structure, how many garbage collection runs are needed, etc., may be stored. This information may or may not be digested, compressed, or otherwise processed, in certain example embodiments.

In a third step, in order to find the appropriate tests associated with certain source code, a second unique identifier may be generated for each method in a modified source file, e.g., using the same MD5 digest technique as described above. The newly generated MD5 digest may be compared with the MD5 digest that was saved in the cache (e.g., the first and second unique identifiers are compared). If there is a difference, then tests that rely on this method can be obtained from the information collected in the previous step. These test steps can be set to run to verify that the change is acceptable. The test steps optionally may be ordered (e.g., shortest execution time first, most failed tests first, etc.).

Example

An example of how the above-described tests may operate will now be provided in the context of a Java-based example. Of course, it will be appreciated that other programming languages, data structures, levels of analysis, digest types, etc., may be used in connection with different implementations.

During the first example step of creating a unique identifier for each method in the source file, etc., in this example Java context, the crawler crawls through each java file in the repository and parses them to build a list of methods and an MD5 digest for each of the methods. The same crawler may also be used to identify other structures in a particular file, and related digests may be generated for these structures and/or the file itself in certain example embodiments. There are multiple ways to parse these files, and any suitable technique may be used in connection with different embodiments. As one example, it is noted that Abstract Syntax Trees (AST) are efficient tools that may be used in connection with certain example implementations. An AST may be used by an Integrated development Environment (IDE), e.g., to manipulate the source file and thus may be a good match for the example techniques described herein. The Eclipse AST parser is one openly available example AST parser that may be used in connection with certain example embodiments. In any event, the parser may call a callback function when it visits each entity in the source file. The callback implementation may build the MD5 digest for each of the methods and/or structures related with a given class.

Consider the following example RepositoryBrowser class:

```
public class RepositoryBrowser {
    public static RepositoryBrowser browser = new
        RepositoryBrowser( );
    static {
        intBrowser( );
    }
    public void visitRepositoryContent(String reponame,
        IRepositoryCallback callback) {
        Ehcache repo = Repository.getRepository(reponame);
        Iterator<Object> ite = repo.getKeys( ).iterator( );
        while (ite.hasNext( )) {
```

```
            Object key = ite.next( );
            Object value = repo.get(key).getValue( );
            if (callback != null) {
                if (! callback.readContent(key, value)) {
                    break;
                }
            } else {
                new ObjectVisitor( ).visit(value);
            }
        }
    }
}
```

The code corresponding to the visitRepositoryContent method may be part of a method MD5 digest. The code above the visitRepositoryContent method (possibly excluding the class definition line) may be part of a class MD5 digest. The digest information may be stored to a distributed cache.

FIG. 1 helps illustrate how a distributed cache storing digests of various code segments may be generated in accordance with certain example embodiments. As shown in FIG. 1, a source code repository 102 is provided. Each file in the source code repository 102 is parsed by the parser 104. MD5 digests are generated by the digester 106, e.g., at the class level, as well as for method and non-method structures within the various classes. This data is stored to a network storage location 108, e.g., in a distributed cache. The first distributed cache structure 110 may include entries for the various classes identified from the files in the source repository 102 and associated MD5 digest values. Similarly, the first distributed cache structure 110 may include entries for the various method and non-method structures within a class, along with their associated MD5 digest values. The method and non-method structures may be linked to their associated classes in certain example embodiments. It will be appreciated that the first distributed cache structure 110 may be implemented via any suitable structure such as, for example, a Terracotta Ehcache structure. Various non-transitory computer readable storage mediums and/or computer systems may make such data available.

During the second example step, tests will be executed, and the methods that each test implicates will be identified. Information concerning, for example, the time required to execute the tests and record the failed tests that will be fed back into the system, also may be gathered. As indicated above, methods may be instrumented on-the-fly by using AOP, and the instrumented code will report the method information when a test runs through it. Frameworks such as, for example, AspectJ support on-the-fly code weaving. An example aspect may be implemented as follows:

```
<aspects>
    <concrete-aspect name="CentrasiteMethodsInterceptorImpl"
        extends="aspects.CentrasiteMethodsInterceptor">
        <pointcut name="csMethodsFilter"
            expression="execution(* *(..))" />
    </concrete-aspect>
    <weaver options="-verbose">
        <include within="com.softwareag..*" />
        <include within="com.centrasite..*" />
    </weaver >
</aspects>
```

This example aspect instructs the framework to call before( ): csMethodsFilter( ) and after( ): csMethodsFilter( ) methods, before and after every method execution under packages com.softwareag and com.centrasite. Example before and after methods are as follows:

```
before( ) : csMethodsFilter( ){
    // collect methods name
}
after( ) : csMethodsFilter( ){
    /* e.g., collect the time consumed by method execution
       and/or other potentially interesting metrics */
}
```

A test listener may be attached using the Junit framework, for example, so that the listener may be notified for each method start and finish. For instance, example end and start methods may be set up as follows, e.g., such that data is saved in the distributed cache at the end of a test, and such that method names are recorded starting when a test begins:

```
public void endTest(Test test) {
    //save the data in distributed cache
}
public void startTest(Test test) {
    /* start recording all method names and other information
       from now until test ends */
}
```

Figure 2:
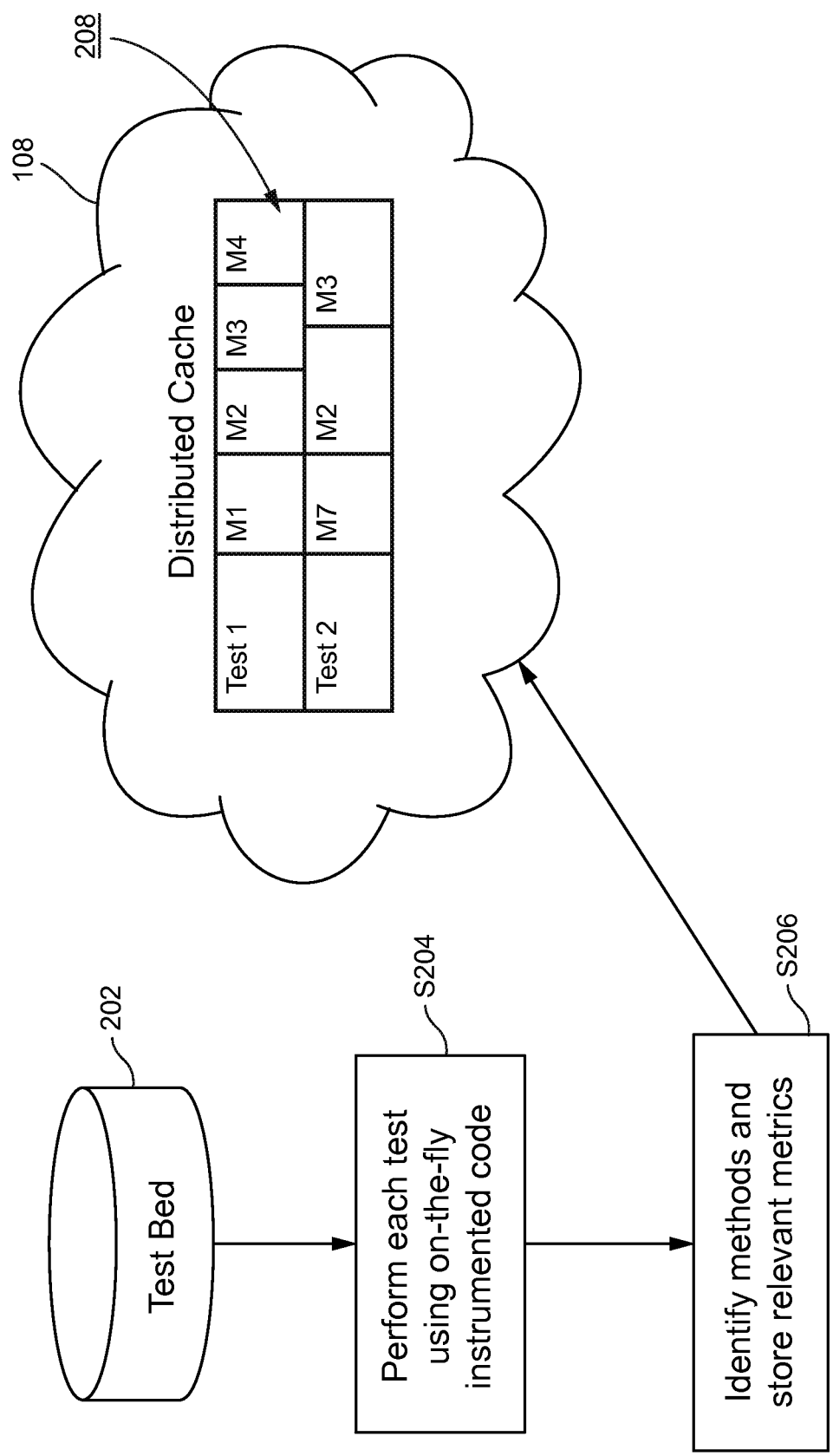
FIG. 2 helps illustrate how the methods used by various tests can be observed, how metrics of interest can be monitored, and how such information can be stored, in accordance with certain example embodiments.

FIG. 2 helps illustrate how the methods used by various tests can be observed, how metrics of interest can be monitored, and how such information can be stored, in accordance with certain example embodiments. A test bed 202 includes a plurality of test procedures. Relevant test procedures are performed (step S204) using on-the-fly instrumentation code (e.g., using AOP techniques). The methods that are involved in the various tests are identified and relevant metrics pertaining to the tests (e.g., execution time, failure bits, etc.) are stored (step S206). This data is stored to the network storage location 108, possibly to a second distributed cache structure 208. This second distributed cache structure 208 may identify, for each monitored test, one or more methods associated therewith, as well as any other metrics of potential interest. As shown in the FIG. 2 example, Test 1 is associated with methods M1, M2, M3, and M4, and Test 2 is associated with methods M7, M2, and M3. It will be appreciated that the various called methods may be stored in order, and that the relevant sizes of blocks may indicate different amounts of time taken to execute the various methods, at least for the purposes of explaining this example.

Once a software engineer or other individual changes the code (e.g., for a feature or a bug fix), the modified source code may be analyzed. Certain example embodiments may then generate a second unique identifier for each method in a modified source file, e.g., using the same mechanism mentioned above. The generated MD5 digest may be compared with the MD5 digest that was saved in the cache. If there is a difference, then a list of tests that rely on or are otherwise implicated by this method can be obtained from the information collected above. These tests can be ordered by execution time (e.g., short to long), by number of failed tests (e.g., high to low), etc., and then the tests can be re-run in such orders. In other words, in certain example embodiments, tests can be executed based on the number of times they failed in the past and/or the amount of time they take to complete. These feedback loops potentially help the tester obtain faster feedback. That is, doing so may potentially help reveal problematic methods, classes, etc., more early by focusing on possible "key" areas, as pointed to be the above-described and/or other metrics.

Figure 3:
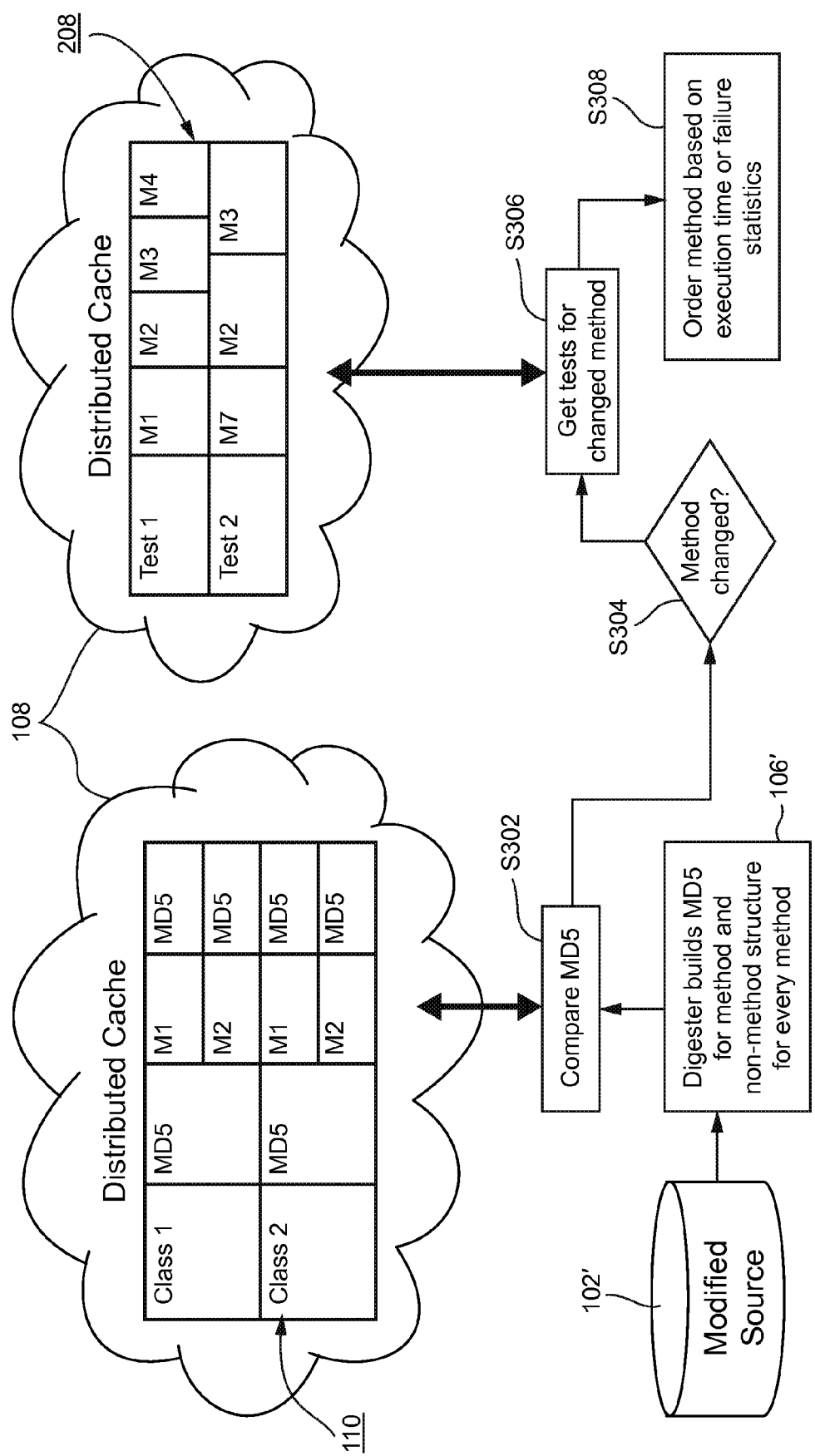
FIG. 3 helps demonstrate how digests may be generated from modified source code segments, and how appropriate test procedures may be selected in response to detected code segments modifications, in accordance with certain example embodiments.

FIG. 3 helps demonstrate how digests may be generated from modified source code segments, and how appropriate test procedures may be selected in response to detected code segments modifications, in accordance with certain example embodiments. As alluded to above, the first structure 110 in the distributed cache 108 may be updated on every new code "check-in" (e.g., to the version control software, etc.), and the second structure 208 in the distributed cache 108 may be updated on every test run. Modified source 102' may be detected (e.g., during a check-in operation by a suitably configured listener) or identified (e.g., by a user). A digester 106' may then operate on the modified source, building a suitable digest for method and non-method structures for each structure present in the modified source 102'. The new digest generated by the digester 106' may be compared with digests in the first structure 110 in step S302. If structures have been changed (e.g., as determined in step S304), the tests associated with the changed method are identified (e.g., in step S306) based on the information stored in the second structure 208. That information may be ordered (e.g., in step S308) based on a variety of metrics, including the example factors listed above. In other words, the tests to be run, methods to be tested, etc., may be ordered in some logical fashion. In certain example embodiments, the list of tests to be run or re-run may be displayed for a user, e.g., on a display of a test computer. The user may select one or more of the tests for execution, and/or specify an order in which the tests are to be run, in certain example embodiments.

Figure 4:
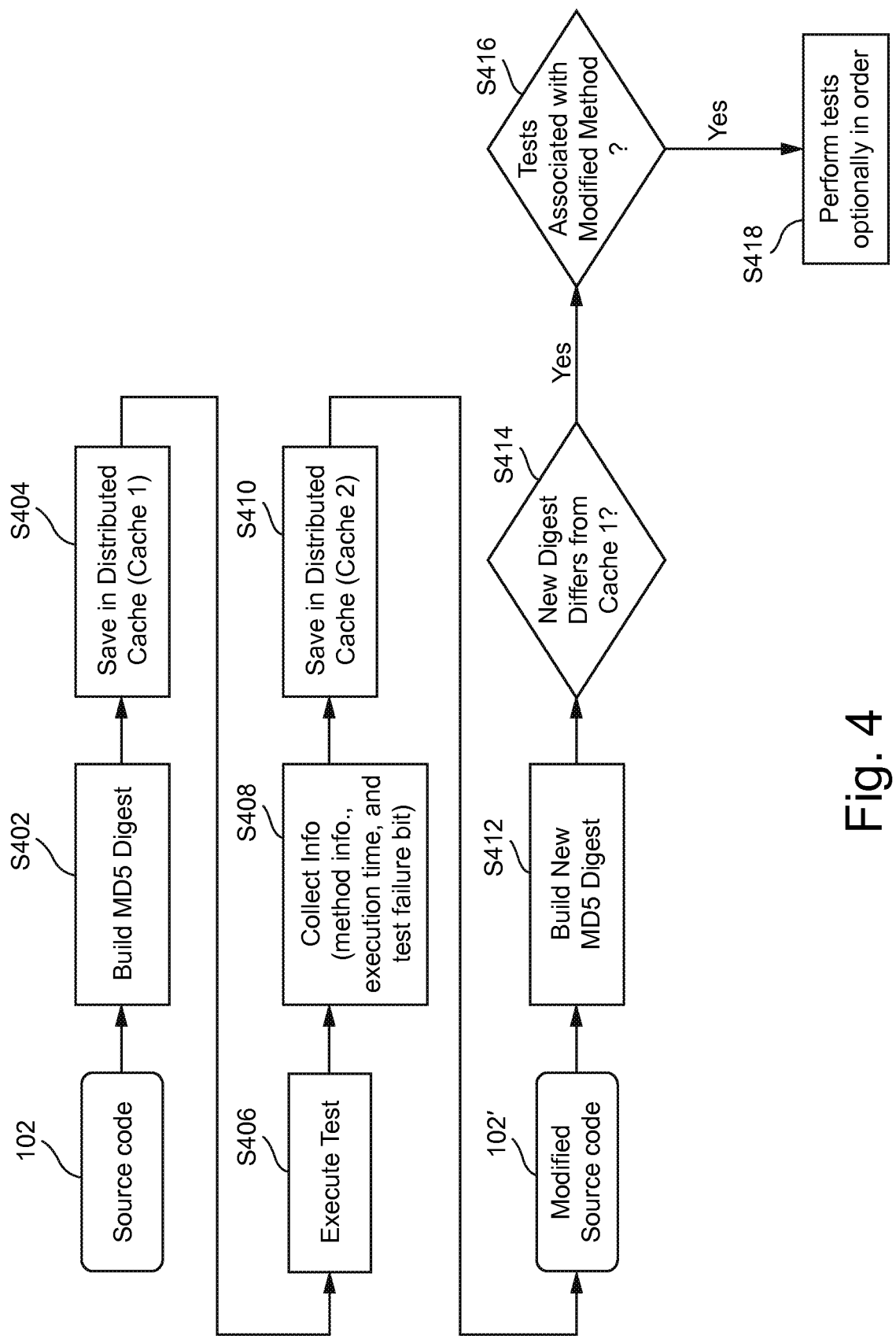
FIG. 4 is a flowchart showing an example process for identifying appropriate tests to be run upon a detected code change in accordance with certain example embodiments.

FIG. 4 is a flowchart showing an example process for identifying appropriate tests to be run upon a detected code change in accordance with certain example embodiments. As shown in FIG. 4, source code 102 is analyzed and an MD5 digest is built in step S402, e.g., for class structures, and method and non-method structures within those class structures. The digests are saved to a distributed cache (Cache 1) in step S404. Tests are executed in step S406, e.g., as a part of the normal development process and possibly according to test plans or test specifications. In step S408, information is collected about the tests including, for example, which tests implicate which methods, how long each test takes to run, what indicates a test failure, etc. This testing information is saved to a distributed cache (Cache 2) in step S410. When a modification to source code is detected or when otherwise triggered (e.g., based on modified source code 102'), one or more new MD5 digest(s) is/are built in step S412. In step S414, it is determined whether the new digest(s) differ(s) from data stored in Cache 1. If so, then Cache 2 is searched in order to determine whether there are tests associated with the modified method or other structures, e.g., in step S416. If the answer to this determination is "yes," then the associated tests are performed in step S418, optionally in an ordered fashion based on the testing information. It will be appreciated that the caches may be maintained as different check-in commits take place, as the tests are run or re-run, when different versions are released, when certain builds or portions of builds are tagged as "good builds" or "good methods," etc. This may enable historical comparisons to be made.

The FIG. 4 flowchart is shown as a serialized process. However, in certain example instances, this need not necessarily be the case. For instance, multiple source code changes may be made before a test run is executed, multiple test runs may be performed on source code before a "build commit" is made (thus potentially delaying the building of Cache 1 and/or Cache 2), multiple source code modifications may be made before testing is run or re-run, etc. Thus, the various rows of processes shown in FIG. 4 may be performed in parallel in some cases, may be repeated some number of times before moving to another row, and/or may be performed in a different order than that shown in FIG. 4.

It will be appreciated that certain example techniques disclosed above may be expanded and used as an incremental but consistent way of analyzing performance issues. Performance issue analysis typically is a laborious process. When there is a performance issue, engineers oftentimes use profilers to help identify and/or diagnose the problem(s). A typical approach involves concentrating on the task, process, resource, etc., that consumes a large amount of processing time, resources, etc., and/or that is executed a large number of times.

Unfortunately, however, such approaches do not always uncover the root problems and frequently focus on symptoms of the problem rather than on the problem itself. Indeed, such analysis sometimes actually masks the exact performance issue. It also is noted that the level and amount of performance analysis also can differ from person-to-person, e.g., based on skill sets, time constraints, perspectives, simple luck, etc. Thus, it will be appreciated that there is a need in the art for a more consistent way of analyzing performance issues, e.g., in a manner that does not mask the underlying causes of the problems, or confuse symptoms of the problem with the problem itself.

Profilers sometimes offer a way to take snapshot of the execution. Comparing two different snapshots might provide a more consistent way to analyze the problem (e.g., because the automated profiler operates irrespective of the person who analyzes the problem), but this level of analysis unfortunately is not always sufficient to provide an adequate and accurate assessment of the root problems. Moreover, if the machines or a process running thereon operates slowly, the slowness may have an impact on the result. This might again distract software engineers, troubleshooters, or others, from concentrating on the aspects mentioned above.

Profilers potentially enable more sophisticated snapshot comparisons, e.g., as they can potentially compare heaps, garbage collection processes, etc., but they still do not indicate whether a particular method has been changed since the last snapshot. This build information may be an important clue in diagnosing problems that arise.

Certain example embodiments, however, look for problems in connection with code changes, potentially without regard for changes in execution time. Indeed, certain example embodiments combine snapshot comparison techniques with predictive techniques concerning whether the code has been changed to help provide a more consistent and incremental way of analyzing performance issues.

Figure 5:
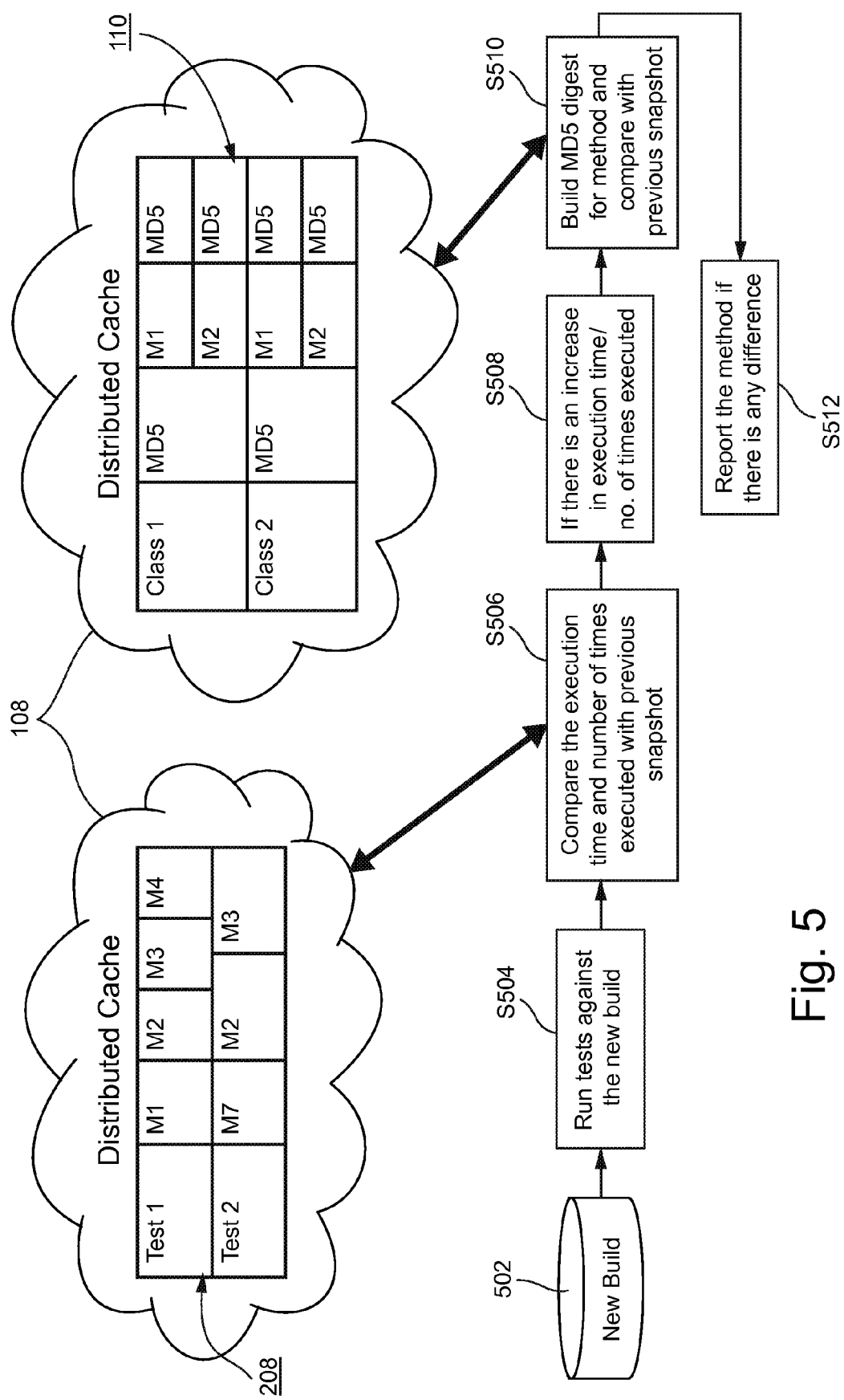
FIG. 5 helps demonstrate how incremental analysis may be performed as between different builds, in accordance with certain example embodiments.

These example techniques may be similar to those identified above. The crawler, digester, and test information gatherer may be substantially the same as those set forth above. However, snapshots may be compared as between different application builds, e.g., with one being the baseline build and the other being the build under evaluation. FIG. 5 helps demonstrate how incremental analysis may be performed as between different builds, in accordance with certain example embodiments. Information concerning a new build 502 is received. Tests are run against the new build in step S504. In step S506, the execution time and number of times a method is executed is compared with a previous snapshot, e.g., in connection with the second structure 208 in the distributed cache 108. If an increase in the execution time or number of times executed is detected in step S508, then an MD5 digest is built for one or more methods of interest and it is compared with a previous snapshot in step S510, e.g., in consultation with the first structure 110 stored in the distributed cache 108. The method(s) of interest may be reported for potential follow-up if there is a difference indicative of a potential code change, etc., in step S512. It will be appreciated that execution times and/or computer resource performance may vary by some amount that is within acceptable limits. Thus, step S506 may in some example instances be concerned with deviations above threshold values. These threshold values may be user-specified in certain example embodiments, and they may be expressed, for example, in terms of percentage increases/decreases, absolute numbers, etc., from a specified value or range of values. In certain example embodiments, the acceptable thresholds may concern average, median, or other values.

Figure 6:
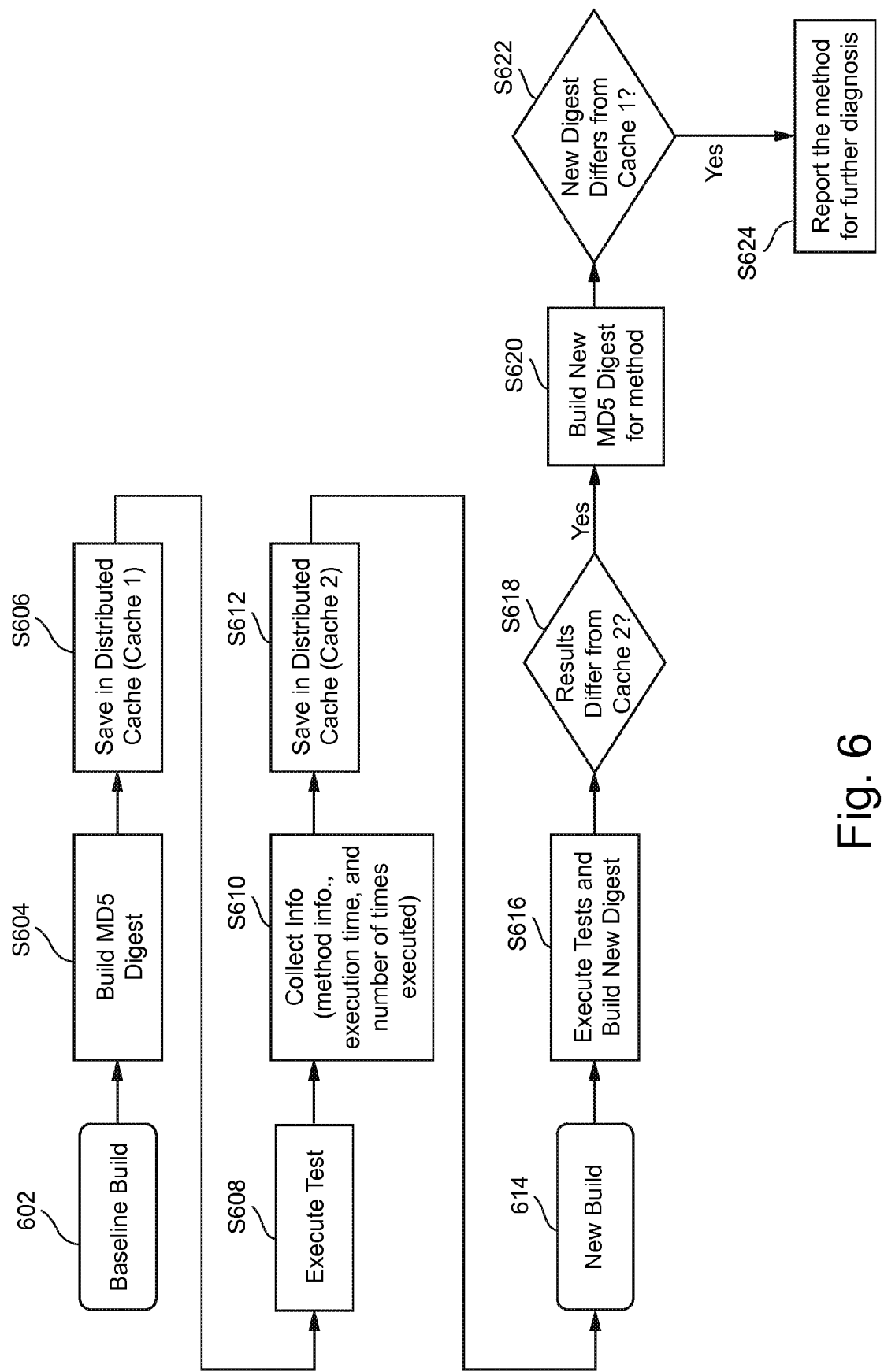
FIG. 6 is a flowchart showing an example process for identifying methods that may warrant further investigation in connection with the incremental analysis techniques of certain example embodiments.

FIG. 6 is a flowchart showing an example process for identifying methods that may warrant further investigation in connection with the incremental analysis techniques of certain example embodiments. A baseline build 602 is received and then subjected to parsing, digesting, and testing, e.g., as described in detail above. For example, in step S604, an MD5 digest is built for the baseline build and its structures (e.g., method and non-method structures), e.g., as indicated above. The digest is saved in a distributed cache (cache 1) in step S606. Tests are executed in step S608, e.g., for this baseline build, and information is collected (for example, concerning which methods are run, how long they take to execute, how many times they are executed, etc.) in step S610. This information also is saved in a distributed cache (cache 2) in step S612. When there is a new build 614, tests are executed on it and a new digest is created in step S616. If the test results differ (e.g., if there is a different result as between the digests in cache 2 and the newly created digests), then a new digest is built for one or more of the methods and/or other structures in step S620. If this new digest differs from the information stored in cache 1, e.g., as determined in step S622, then the corresponding code segments (e.g., classes, methods, other structures, etc.), are reported for possible further diagnosis and/or follow-up in step S624.

In one or more steps not shown, this information may be cross-referenced with profiler snapshots to help demonstrate likely candidates for root causes of the encountered problems. There sometimes are reasons for performance degradation, even if there is no code change, e.g., in connection with programming languages that are based on virtual machines (e.g., the Java Virtual Machine or JVM). For example, the JVM assumes a garbage collection technique if there is nothing explicitly configured. The default selection might not be a better choice for a type of application and it might trigger frequent collections when not actually required. In such cases, profilers can help sometimes help uncover the amount of time spent on garbage collections.

Similar to as noted for FIG. 4 above, the example steps in the FIG. 6 process may be performed in any suitable combination, sub-combination, and/or order. For instance, process steps may be parallelized, repeated for different builds and/or test procedures, etc.

Certain example embodiments have been described in connection with modifications to existing method and/or non-method structures. However, it will be appreciated that the technology disclosed herein is not limited solely to detecting modifications. For instance, certain method or non-method structures may be added or completely deleted. This may be handled in certain example embodiments when a change is detected at the class level (or at a level above such added or deleted structures). As set forth herein, mismatch detection as between the first and second unique identifiers may help account for additions and/or deletions, e.g., in the sense that a modification will result in the mismatch as between found identifiers, an addition will result in a mismatch in the sense that no first identifier (or descriptor therefor) will be identified, a deletion will result in a mismatch in the sense that no second identifier (or descriptor therefor) will be generated, etc. In certain example embodiments, method and non-method structure additions and/or deletions may be specifically searched for and handled appropriately.

"Modifications" should be understood as modifications to code structure(s) including, for example, additions, deletions, and modifications, to the existing code. Consider, for example, the following example snippets of original code and modified code. The example techniques herein may or may not differentiate between additions, deletion, or modifications, e.g., because it may instead detect any such code alterations because there will be a change in relevant MD5 digest, leading to the execution of the appropriate tests.

Original Code Snippet:

```
public void creditInterest(long accountNumber, float principle,
    float interestRate) {
        if(interestRate <0) {
            interestRate = 5;
        }
        float interestAmount = principle +
            principle* (interestRate /100)
        if(accountExist(accountNumber)){
            updateAccount(accountNumber, interstAmount);
        }
    }
    private void updateAccount long accountNumber, float
        interestAmt) {
        //save the info in DB
    }
```

Modified Code Snippet:

```
public void creditInterest(long accountNumber, float principle,
float interestRate) {
        float defaultInterestRate = 5f; // addition
        if(interestRate <0) {
            interestRate = defaultInterestRate; // edit
        }
        float interstAmount = principle +
            principle*( interestRate /100)
        updateAccount(accountNumber, interstAmount);
        // deletion, accountExist method moved into updateAccount
}
private void updateAccount long accountNumber, float
    interestAmt) {
        if(accountExist(accountNumber)){
            //save the info in DB
        }
}
```

In certain example embodiments, default rules may be adopted such that, for example, all tests associated with a deleted structure may be run upon a detected deletion, all tests in the test bed may be run when a new structure is added (which may apply for any new structure, or only some subset of structures such as, for example, method or class level structures only, etc.), and/or the like.

The example techniques described herein may be advantageous for a number of reasons. For instance, the ability to cache digests of the methods and/or other code structures in a distributed fashion is potentially advantageous, e.g., in that it possibly allows multiple research and development locations to test the same sections of code. Thus, certain example embodiments are well suited for distributed product development models. The distributed environment of certain example embodiments also provides a convenient mechanism to store and maintain the relationships between methods and other code structures and tests, potentially reflecting changes over time, and/or accepting feedback loops (e.g., related to past execution history and execution time)

As another example advantage, the automated relating of methods or other code structures to specific tests may (e.g., as opposed to predefining such relationships) take some of the "guesswork" out of debugging, potentially revealing unintended or unexpected mappings therebetween. In a similar vein, certain example embodiments advantageously are able to compute the relationship between tests and code segments based on runtime execution of tests and, as a result, do not necessarily need to assume predefined relationships between code segments and tests. And because certain example embodiments use a simple mechanism to relate tests and code segments (e.g., on-the-fly weaving, Junit-based listeners to start/stop recording, etc.), they advantageously can be easily integrated into development environments—potentially even those that are dynamic.

Although certain example embodiments have been described in connection with the MD5 message-digest algorithm, it will be appreciated that other hash functions may be used in connection with different example embodiments. For instance, MD5 is not fully collision resistant. Thus, where there are security concerns, or where there is a huge amount of data that might possibly create MD5 collisions, it may be desirable to use different hash functions. The SHA family of hash functions (including, for instance, SHA-1 and SHA-2) may be used in certain example embodiments, e.g., for better collision resistance.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate transitory or non-transitory/tangible computer readable storage medium. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for testing computer code, the method comprising:
    receiving source code related to an application to be executed on a computer system including processing resources;
    parsing the source code into plural identified structures;
    applying, using a test computer, a hash algorithm to each of the identified structures in the source code in order to generate a corresponding first unique identifier for each of the identified structures in the source code;
    storing the first unique identifiers to a non-transitory computer readable storage location;
    performing, under the direction of the test computer, tests on the application in connection with the source code;
    identifying, using the test computer, structures in the source code associated with each performed test;

storing, to a or the non-transitory computer readable storage location, a mapping between the performed tests and the identified structures associated with the performed tests;

receiving modified source code related to the application;

parsing the modified source code into plural identified structures;

applying the hash algorithm to each of the identified structures in the modified source code in order to generate a corresponding second unique identifier for each of the identified structures in the modified source code;

comparing the first and second unique identifiers related to corresponding identified structures in the source code and the modified source code, respectively; and when a difference is detected between compared first and second unique identifiers, generating, from the mapping, a list of tests associated with the non-matching identifiers.

2. The method of claim 1, wherein the hash algorithm is the MD5 algorithm and the first and second unique identifiers are MD5 digests.

3. The method of claim 1, wherein identifiable structures include method and non-method structures.

4. The method of claim 3, wherein identifiable non-method structures include class structures.

5. The method of claim 1, wherein the mapping further includes metrics for the tests including respective execution times and/or number of failures.

6. The method of claim 5, further comprising ordering tests in the list based on metrics associated with the tests therein.

7. The method of claim 6, further comprising causing the tests in the list to be re-run, in order.

8. The method of claim 1, wherein the first unique identifiers and the mapping are stored to the same or different distributed cache(s).

9. The method of claim 1, wherein the tests on the application are performed in connection with method structures in the code being instrumented on the fly.

10. A method for testing computer code, the method comprising:

receiving source code related to an application to be executed on a computer system including processing resources;

parsing the source code into plural identified structures;

applying, using a test computer, a hash algorithm to each of the identified structures in the source code in order to generate a corresponding first unique identifier for each of the identified structures;

storing the first unique identifiers to a non-transitory computer readable storage location;

performing, under the direction of the test computer, tests on the application in connection with the source code;

identifying, using the test computer, structures in the source code associated with each test;

storing, to a or the non-transitory computer readable storage location, a mapping between the performed tests and the identified structures associated with the tests;

gathering first computer processing resource performance information for the processing resources of the computer system during execution of the application in connection with the source code;

storing the first computer processing resource performance information in connection with the mapping;

receiving modified source code related to the application;

gathering second computer processing resource performance information for the processing resources of the computer system during execution of the application in connection with the modified source code;

comparing first and second computer processing resource performance information for each of the processing resources of the computer system; and when a difference is detected between the compared first and second computer processing resource performance information and the difference exceeds a predetermined threshold value:

parsing the modified source code into plural identified structures;

applying the hash algorithm to each of the identified structures in the modified source code in order to generate a corresponding second unique identifier;

comparing first and second unique identifiers related to corresponding identified structures in the source code and the modified source code, respectively; and when a difference is detected between compared first and second unique identifiers generating, from the mapping, a list of any tests associated with the non-matching identifiers.

11. A non-transitory computer readable storage medium tangibly storing instructions that, when executed by at least one processor of a test computer system, perform at least the method of claim 1.

12. A non-transitory computer readable storage medium tangibly storing instructions that, when executed by at least one processor of a test computer system, perform at least the method of claim 5.

13. A non-transitory computer readable storage medium tangibly storing instructions that, when executed by at least one processor of a test computer system, perform at least the method of claim 10.

14. A test system, comprising:

at least one processor and a memory arranged to execute plural modules;

a parser module configured to receive original source code and modified source code related to an application to be executed on a computer system including processing resources and to identify plural structures in the received original source code and the modified source code, wherein the structures are identifiable as being one of a method structure or a non-method structure;

a digester module configured to apply a hash algorithm to each identified structure in the original source code in order to generate a corresponding first unique identifier for each of the identified structures in the original source code, and configured to apply the hash algorithm to each identified structure in the modified source code in order to generate a corresponding second unique identifier for each of the identified structures in the modified source code;

a non-transitory computer readable medium configured to store the unique identifiers, wherein the test system is configured to use its at least one processor to at least:

cause tests to be performed on the application in connection with the original source code, determine which identified structure(s) in the original source code is/are associated with each said test, and store a mapping between the performed tests and the identified structure(s) of the original source code associated with the tests to a or the non-transitory computer readable medium; and further comprising a comparison module configured to:
compare first and second unique identifiers related to corresponding identified structures in the original source code and the modified source code, respectively, and
generate from the mapping, when a difference is detected between compared first and second unique identifiers, a list of tests associated with the non-matching identifiers.

15. The system of claim 14, wherein the hash algorithm is the MD5 algorithm and the first and second unique identifiers are MD5 digests.

16. The system of claim 14, further comprising an aspect oriented programming instrumentation subsystem configured to cause identified methods to be instrumented on-the-fly and to gather method performance information, in connection with the performing of the tests.

17. The system of claim 16, wherein the list is ordered based at least in part on method performance information.

18. The system of claim 14, wherein the non-transitory computer readable medium is a distributed cache.

19. The system of claim 14, further comprising an application profiler configured to track performance statistics of the processing resources of the computer system on which the application is executed, at least during testing.

20. A test system, comprising:
at least one processor and a memory arranged to execute plural modules;
a parser module configured to receive source code related to an application to be executed on a computer system including processing resources and to identify plural structures in the received source code, wherein the structures are identifiable as being one of a method structure or a non-method structure;
a digester module configured to apply a hash algorithm to each identified structure in the source code in order to generate a corresponding unique identifier;
a non-transitory computer readable medium configured to store the unique identifiers, wherein the test system is configured to use its at least one processor to at least:
cause tests to be performed on the application in connection with the source code,
determine which identified structure(s) in the source code is/are associated with each said test, and
store a mapping between the performed tests and the identified structures associated with the tests to a or the non-transitory computer readable medium;
an application profiler configured to track performance statistics of the processing resources of the computer system on which the application is executed, at least during testing, wherein the application profiler is configured to track performance statistics of the processing resources of the computer system on which the application is executed during testing for both first and second separate builds of the application;
a first comparison module configured to compare performance statistics associated with the first and second builds, wherein code for the first and second builds is provided to the parser, and identified structures generated by the parser are provided to the digester in order to generate first and second unique identifiers for the first and second builds, respectively;
a second comparison module is configured to compare first and second unique identifiers related to corresponding identified structures in the first and second builds, respectively, when the first comparison module indicates that there is a potentially significant deviation between performance statistics for the first and second builds; and
a report module configured to generate a list of any tests associated with the first and second unique identifiers that do not match as determined by the second comparison module.

21. The system of claim 14, wherein the test system is accessible by plural authorized users at different respective locations.

22. A test system, comprising:
at least one processor and a memory arranged to execute plural modules;
a parser module configured to receive source code related to an application to be executed on a computer system including processing resources and to identify plural structures in the received source code, wherein the structures are identifiable as being one of a method structure or a non-method structure;
a digester module configured to apply a hash algorithm to each identified structure in the source code in order to generate a corresponding unique identifier;
a non-transitory computer readable medium configured to store the unique identifiers,
wherein the test system is configured to use its at least one processor to at least:
cause tests to be performed on the application in connection with the source code,
determine which identified structure(s) in the source code is/are associated with each said test, and
store a mapping between the performed tests and the identified structures associated with the tests to a or the non-transitory computer readable medium;
a listener configured to detect code check-in events at a source code repository and to initiate testing as between code designated as baseline code and newly checked-in code by:
providing to the parser module the newly checked-in code;
providing to the digester module second identified structures for the newly checked-in code; and
initiating a comparison module that is configured to:
compare first and second unique identifiers related to corresponding identified structures in the baseline code and the newly checked-in code, respectively, and
generate from the mapping, when a difference is detected between compared first and second unique identifiers, a list of any tests associated with the non-matching identifiers.

23. The system of claim 22, wherein the hash algorithm is the MD5 algorithm and the first and second unique identifiers are MD5 digests.

24. The system of claim 22, further comprising an application profiler configured to track performance statistics of the processing resources of the computer system on which the application is executed, at least during testing.

25. The system of claim 22, wherein the test system is accessible by plural authorized users at different respective locations.

* * * * *